April 14, 1964 R. McVAY 3,128,572
FISHING LURE
Filed March 10, 1961
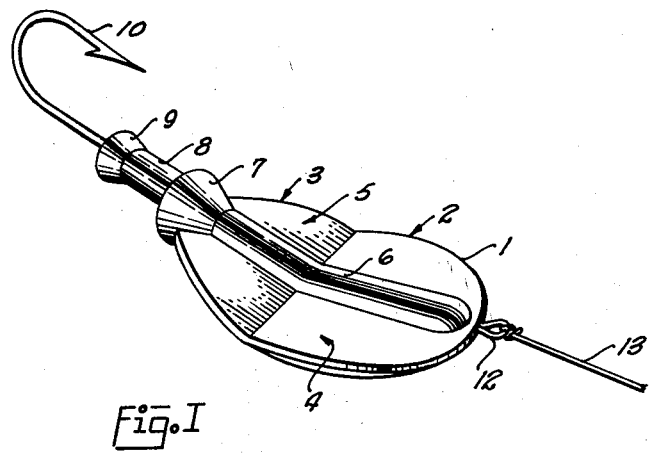
Fig. I
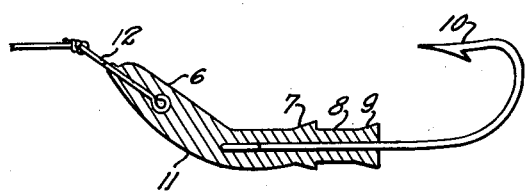
Fig. II
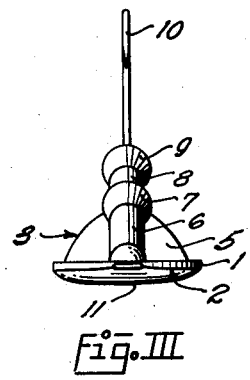
Fig. III
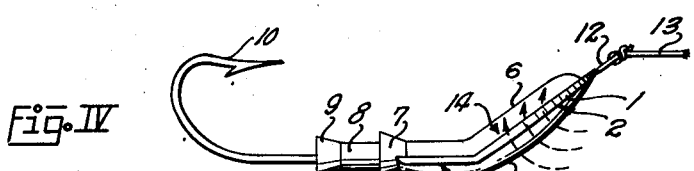
Fig. IV
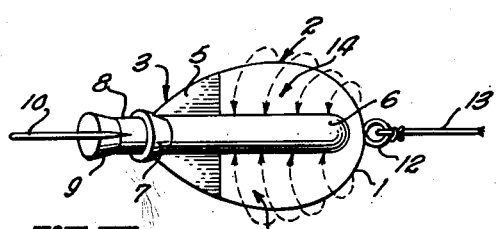
Fig. V
INVENTOR
Raymon McVay
BY Howard E. Moore
ATTORNEY

United States Patent Office 3,128,572
Patented Apr. 14, 1964

3,128,572
FISHING LURE
Raymon McVay, 717 W. Morgan, Denison, Tex.
Filed Mar. 10, 1961, Ser. No. 94,856
1 Claim. (Cl. 43—42.45)

This invention is concerned with a fishing lure, and is particularly concerned with a fishing lure which is so constructed and balanced that by the resistance of the water and the flow thereof about the surface of the lure, as the lure is pulled through the water, that it is caused to move sidewise back and forth, and to rock about its horizontal axis, thereby making the lure, by reason of its lively movement in the water attractive to fish.

The lure is so made that the front part is turned angularly upwardly with relation to the rear part, and is so balanced, with the rear part slightly heavier than the front part, that when pulled through the water the front part is turned upwardly at an angle with relation to the rear part, and the rear part moves through the water in a substantially horizontal position. The front end of the lure is rounded or oval shaped, so that the water passes over the oval surface and about the outer edges thereof, causing the lure to move from side to side as it is pulled through the water.

A rounded rib extends from the front to the rear of the body of the lure and medially along the upper side thereof, so that the breaking of the water by the rounded face of the angularly upturned front part of the lure, causes a partial vacuum on the upper face of such angularly disposed front end, which partial vacuum tends to draw the water passing about the edges of the front portion of the lure inwardly over the top surface thereof to strike the rib, thereby causing the lure to rock back and forth about its horizontal axis. The rib also serves the purpose of a keel on the upper side of the body of the lure which prevents the lure from turning over when it is pulled rapidly through the water by reason of the resistance of the rib against the water as the water flows longitudinally of the upper side of the body along the rib.

The lure body also has a skirt provided on the rear end thereof about which articifical lure material, such as feathers, nylon threads, artificial worms, or other fish attracting material, may be attached to attract the fish and conceal the hook which extends from the rear of the body. The point of the hook is turned upwardly with relation to the body, and behind the upper end of the upwardly angled portion of the body so that it is protected against becoming fouled by weeds or other obstructions in the water as the lure is pulled therethrough.

Furthermore, the lure may be pulled along the bottom and will not become fouled with weeds or underbrush because the point of the hook is in protected position behind the upwardly turned front end of the lure body, and the rounded, upwardly turned front end serves as a prow to push aside obstructions which it might encounter and prevent them from contacting the hook.

It is, therefore, a primary object of the invention to provide a fishing lure which has an unusual motion as it is drawn through the water, namely, a side to side motion, and a wobbly motion about its longitudinal axis, thus providing a lure which attracts the attention of the fish in the vicinity.

Another object of the invention is to provide a fishing lure having a generally flat body with an upturned front end thereof, which is so balanced that the upturned front end normally extends upwardly while the lure is drawn through the water, and having a rounded front end on the lure, which by reason of the resistance of the water thereagainst causes the lure to have a side to side movement.

A still further object of the invention is to provide a fishing lure having an upturned front end thereon, and a rear horizontal portion, with a generally flat body, having a rounded ridge extending centrally of the upper side thereof from front to rear, which by action of the water thereagainst as the lure is drawn therethrough, causes the lure to have a wobbly motion from side to side about its longitudinal axis.

Still another object of the invention is to provide a lure consisting of a generally flat body, having an upwardly turned front end thereon, with a hook extending from the rear end thereof with the point of the hook disposed behind the upwardly turned front end as the lure is drawn through the water, thus protecting the point of the hook against obstructions encountered in the water.

Another object of the invention is to provide such a lure, having a lure material attachment extension on the rear end thereof adjacent the hook to conceal the hook and provide attraction for fish.

Other and further objects of the invention will become apparent upon reading the detailed specification hereinafter following, and by referring to the drawing annexed hereto and made a part hereof.

A suitable embodiment of the invention is shown in the attached drawing wherein:

FIGURE I is an upper perspective view of the lure incorporating the improvements comprehended by this invention;

FIGURE II is a side elevational view of the lure;

FIGURE III is a fragmentary perspective view of the lure;

FIGURE IV is a side elevational view of the lure, as it appears while being pulled through the water; and FIGURE V is a top plan view of the lure.

Numeral references are employed to designate the various parts shown in the drawing, and like numerals indicate like parts throughout the various figures of the drawing.

The numeral 1 indicates a body which comprises a front portion 2 and a rear portion 3, the said front and rear portions being angularly turned with respect to each other, and each having flat upper surfaces 4 and 5, respectively, thereon, which are traversed longitudinally by an upwardly extended rounded rib 6, which extends centrally thereof.

The rib 6 converges into a frusto-conical shaped collar 7 at the rear of the body 1, and extending rearwardly of the larger diameter of the collar 7 is a cylindrical shaped extension 8 which terminates with a frusto-conical terminal end portion 9 from which extends a hook 10, with the point of the hook directed upwardly of the upper surface of the body 1.

The lower surface of the body 1 is oval shaped, as indicated at 11, for the purpose which will be hereinafter mentioned.

An eye 12 is attached to the front of the body 1 and centrally thereof, to which eye is attached a fishing line 13.

The body 1, including the rib 6, the collar 7, extension 8, and terminal end 9, are preferably molded in one piece of lead or other suitable moldable metallic or plastic material, with the shank of the hook 10 and the shank of the eye 12 molded therein. However, it will be understood that the lure could be made of other material such as plastic.

It is a matter of importance to note that the weight of the body 1 is so balanced that it is heavier on the rear end than it is on the front end so that it will normally assume the position shown in FIG. II with the rear portion 3 in substantially horizontal position, and with the front portion 2 inclined upwardly at an angle with reference thereto.

When the lure is pulled through the water it will normally assume the position shown in FIGS. II and IV, with the upwardly angled front end 2 being turned angularly upwardly with reference to the direction of movement of the lure so that as the water strikes the oval shaped front end of the lure, the water is directed thereabout and about the edges of the front end of the lure. The oval shaped surface causes the lure to move from side to side, because it does not have a keel to keep it in a straight course. The water is deflected around the front end of the body, which creates a partial vacuum in the area indicated at 14 behind the front portion 2 of the body and on each side of the rib 6, which causes the water to be drawn in toward the rib 6 on each side thereof in the direction indicated by arrows in FIGS. IV and V. The inwardly directed water strikes the sides of the rib 6 causing the opposite sides of the lure to oscillate up and down in a rocking motion about the longitudinal axis thereof. Therefore, the lure has a wiggly-wobbly motion as it progresses through the water, which is very attractive to fish.

The rib 6 also has another function in that the water, after it strikes the rib 6, is caused to flow backwardly therealong on each side thereof which causes the ribs 6 to act as a keel on the upper surface of the body 1 to keep the lure from turning over as it is pulled through the water. The water is then directed outwardly in a diverging pattern over the frusto-conical shaped member 7 to enter the feathers, hair or other lure material which may be tied about the extension 8, which causes the lure material to have a fluttering motion in the water to further serve as a further attraction to fish and spreads it outwardly so that it will conceal the hook 10. The enlargement 9 at the extreme rear end of the body 1 provides a retaining shoulder for the lure material which is tied about the extension 8.

It will further be noted that as the lure is pulled through the water in normal position, as shown in FIG. IV, the point of the hook 10 is disposed behind the upwardly turned front end portion 2 of the body 1 in concealed position, so that the upwardly turned front end 2 of the body 1 serves as a prow to deflect weeds, brush or other material in the water, about the body of the lure, away from the point of the hook 10, to prevent the hook from becoming fouled therewith.

Furthermore, when the lure is pulled slowly along the bottom, the front end portion 2 also acts as a prow to push aside weeds, grass, brush, and other obstructions on the bottom of the lake, or other body of water, to prevent it from becoming entangled with the hook 10.

It will be seen that I have provided a fishing lure which has a body with an upwardly turned front end portion and is so constructed and balanced that the front end portion is normally turned upwardly as the lure is pulled through the water, which provides a side to side movement and wobbly movement of the lure by reason of the action of the water on the surfaces thereof, and which protects the point of the hook against obstructions which might be encountered in the water.

It will be understood that other and further forms of my invention may be devised and made without departing from the spirit and scope of the appended claim.

Having described my invention, I claim:

In a fishing lure, a body having a front portion and a rear portion angularly disposed with relation to each other; a continuous convex surface on the lower side of the front and rear portions; a rounded rib extending continuously, centrally, and longitudinally of the upper surface of the front and rear portions; the body being so balanced that the front portion extends angularly upwardly from the rear portion when pulled through the water; a frusto-conical collar attached to the rear end of the rear portion of the body; a cylindrical extension extending from the larger circumference of the collar; a frusto-conical collar secured to the rear end of the extension; and a hook attached to the rear of the body.

References Cited in the file of this patent

UNITED STATES PATENTS

| 1,440,869 | Foss | Jan. 2, 1923 |
| 2,589,117 | Oberbeck et al. | Mar. 11, 1952 |
| 2,594,038 | Lauterwasser | Apr. 22, 1952 |